United States Patent
Elliot et al.

(10) Patent No.: US 6,971,632 B2
(45) Date of Patent: Dec. 6, 2005

(54) THROTTLE PLATE WEDGE

(75) Inventors: Ed Elliot, Clinton Township, MI (US); Earl R. Austin, III, Milan, MI (US); Brad Paine, Oxford, MS (US); Keith Miller, Water Valley, MS (US)

(73) Assignee: BorgWarner Inc., Auburn Hills, MI (US)

( * ) Notice: Subject to any disclaimer, the term of this patent is extended or adjusted under 35 U.S.C. 154(b) by 88 days.

(21) Appl. No.: 10/104,232

(22) Filed: Mar. 22, 2002

(65) Prior Publication Data

US 2002/0174851 A1 Nov. 28, 2002

Related U.S. Application Data

(60) Provisional application No. 60/278,100, filed on Mar. 23, 2001.

(51) Int. Cl.⁷ ............................................. F16K 1/22
(52) U.S. Cl. ..................... 251/305; 251/208; 123/337; 137/15.25
(58) Field of Search ............................... 251/205, 208, 251/305, 306, 307, 308; 123/337; 137/15.25

(56) References Cited

U.S. PATENT DOCUMENTS

| | | | |
|---|---|---|---|
| 3,176,704 A * | 4/1965 | De Palma | 251/305 X |
| 3,770,242 A * | 11/1973 | O'Connor, Jr. | 251/305 |
| 5,666,988 A * | 9/1997 | Becker | 251/308 |
| 6,003,490 A * | 12/1999 | Kihara et al. | 123/337 |
| 6,047,950 A * | 4/2000 | Pontoppidan et al. | 251/305 |
| 6,138,988 A * | 10/2000 | Bouvet et al. | 251/306 |
| 6,431,142 B1 * | 8/2002 | Armatis | 123/337 |

FOREIGN PATENT DOCUMENTS

WO    WO 9719264 A1 *   5/1997  ............. F02D 9/10

* cited by examiner

*Primary Examiner*—Eric Keasel
(74) *Attorney, Agent, or Firm*—Warn, Hoffmann, Miller & LaLone, PC; Greg Dziegielewski

(57) ABSTRACT

A throttle plate assembly with a wedge for limiting air flow upon initial acceleration.

18 Claims, 4 Drawing Sheets

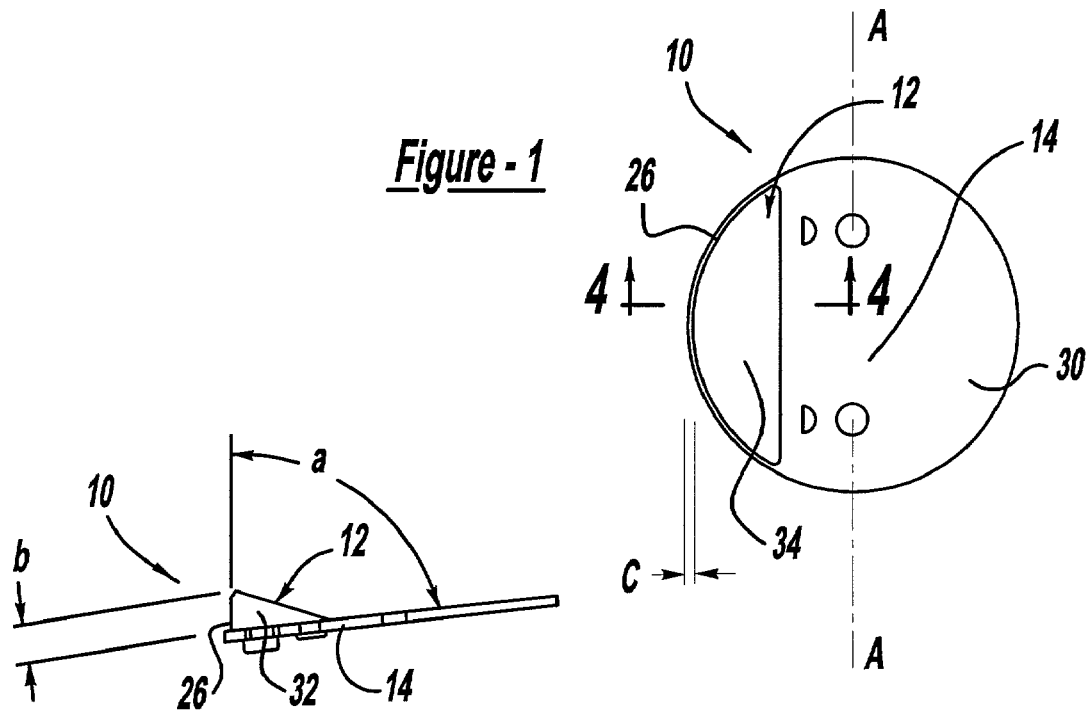
*Figure - 1*
*Figure - 2*
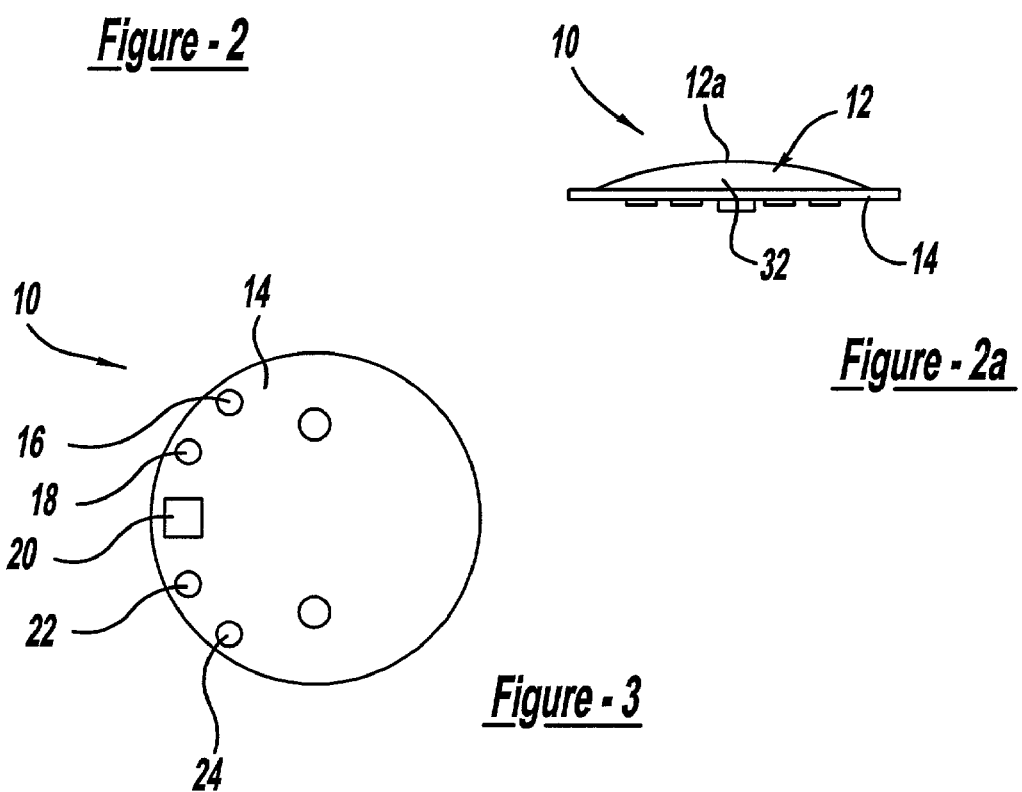
*Figure - 2a*
*Figure - 3*

THROTTLE PLATE WEDGE

CROSS-REFERENCE TO RELATED APPLICATIONS

This application claims the benefit of U.S. Provisional Application Ser. No. 60/278,100, titled "Throttle Plate Wedge", filed Mar. 23, 2001.

TECHNICAL FIELD

The present invention relates to a throttle plate design for use on the throttle plate of a throttle body for air control of a vehicle. More specifically, the present invention relates to an advantageous throttle body design which improves vehicle drivability, vehicle performance and reduces engine noise.

BACKGROUND OF THE INVENTION

Throttle plates are known in the art, and are typically flat "butterfly" valve members which are pivoted on an axis for opening or closing the throttle bore in a throttle body of an air control system for an internal combustion engine. In recent years, due to the increasingly stringent requirements for getting more performance out of lighter and smaller engines, a problem has developed. To improve engine performance, the throttle bore size has increased, resulting in a loss of fine metering control of airflow in the off idle range. Upon acceleration, the throttle plate is opened, allowing excess air to enter the intake of the engine and causes drivability issues related to rapid vehicle acceleration.

Also, these butterfly valves are typically thin plates which create vortices as air passes through the throttle body. In some cases, this creates unwanted whistling or other air noises. Therefore, it is desirable to cut down on air rush noise due to such throttle plates.

SUMMARY OF THE INVENTION

In accordance with the present invention, these problems are solved by providing a wedge portion on one half of the throttle plate member. The wedge portion has a thickness on the radially outer portion of one hemispherical side of the throttle plate, and is reduced inboard from that point to a cross-sectional triangular shape. In operation, the wedge portion is lowered toward the intake manifold side of the throttle body, and as it is lowered over a certain predetermined angle, the wedge reduces the intake of air to a predetermined amount over the initial accelerating movement of the throttle plate assembly. This reduces the amount of air immediately let into the throttle body, thus improving drivability.

The use of the wedge portion of the throttle body is an improvement on the prior art designs in that it reduces the noise attributable to the throttle plate and, therefore, reduces intake engine noise. Preferably, the wedge portion is overmolded from a lightweight plastic material or the like onto the throttle plate.

A further understanding of the present invention will be had in view of the description of the drawings and detailed description of the invention, when viewed in conjunction with the subjoined claims.

BRIEF DESCRIPTION OF THE DRAWINGS

FIG. 1 is a top plan view of the throttle plate of the present invention;

FIG. 2 is a side view of the throttle plate of FIG. 1;

FIG. 2a is a front view of the throttle plate of the present invention;

FIG. 3 is a bottom view of the throttle plate of the present invention;

DETAILED DESCRIPTION OF THE PREFERRED EMBODIMENT

Figure 4:
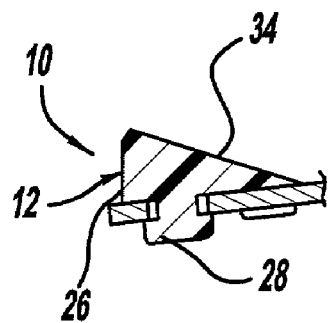
FIG. 4 is a detailed side view taken along line 4—4 of FIG. 1.
Figure 5:
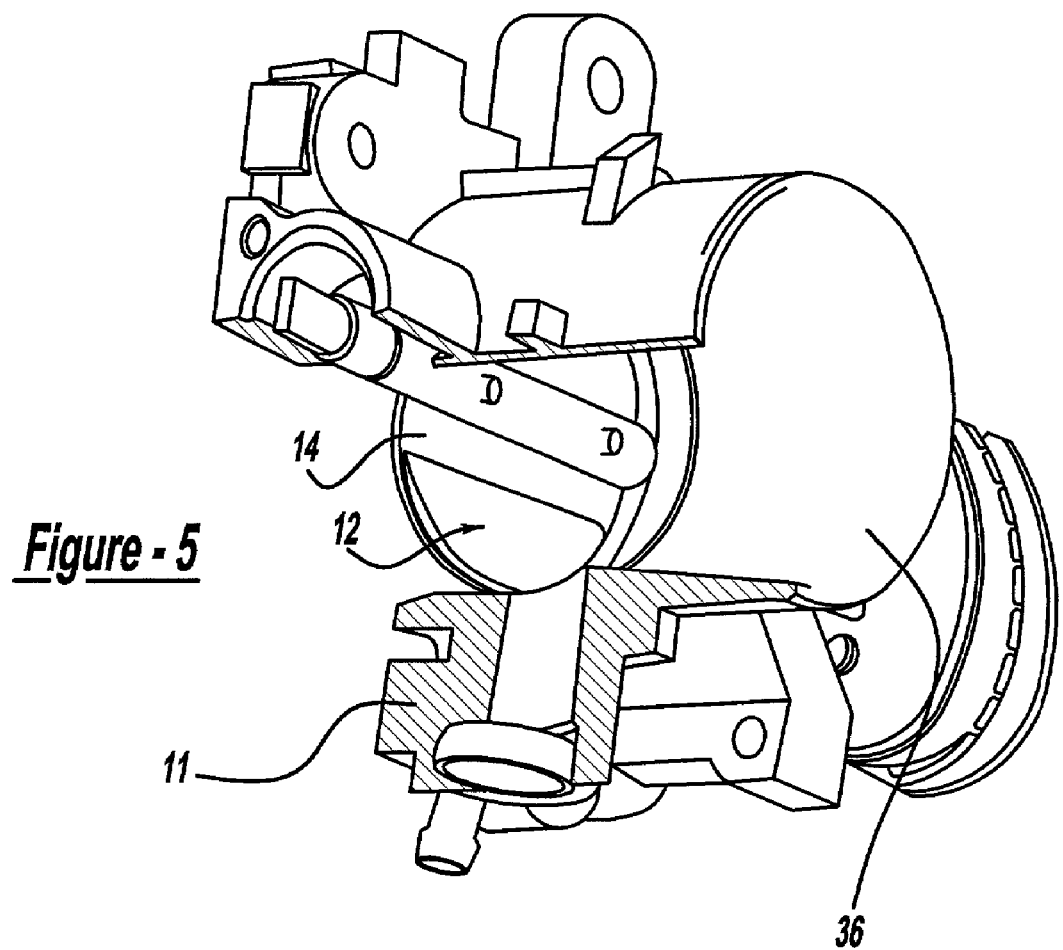
FIG. 5 is a detailed view of the throttle plate (partially broken away) of FIG. 1 in a throttle body environment in the closed position.
Figure 6:
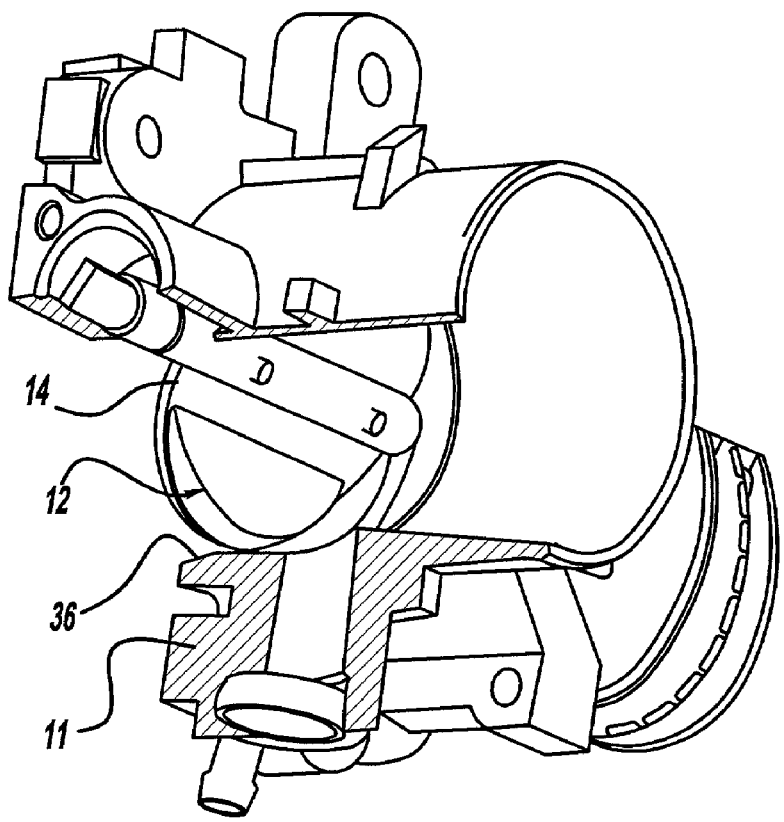
FIG. 6 is a detailed view of the throttle plate of FIG. 1 in a throttle body environment in the partially open position with the wedge portion partially restricting airflow.

As set forth above, in the present invention a throttle plate generally shown at 10 is utilized in a throttle body 11. Throttle plate 10 includes a wedge portion generally indicated at 12, which is attached to the throttle plate 10 on a first hemispherical section thereof 14. The throttle plate 14 includes orifices 16, 18, 20, 22 and 24 therein. The throttle plate wedge includes a radially outermost portion 26 which is thick at the point which is outermost or perpendicular to the axis A—A of the throttle plate, and has a triangular cross-section.

An upstanding outer peripheral wall 32 forms the radially outer edge of the throttle plate wedge 12. This wall has a radiused shape form following the outer edge of the throttle plate, as shown in FIG. 1. Because of the "wedge" shape, the wall 32 has a radiused appearance from the frontal view, as shown in FIG. 2a. As the valve plate is opened further, the restricted portion having the wedge opens up and no longer has any appreciable affect on airflow through the throttle bore 36.

In a preferred embodiment, the throttle plate wedge is overmolded onto the throttle plate, and a securing portion 28 is overmolded as a continuous section for securing the wedge portion in position. As will be readily appreciated by those skilled in the art, the wedge portion is placed on the portion 14 of the throttle plate. The portion 14 is pivoted into the throttle body toward the manifold side when opening the throttle plate 10 during acceleration. Thus, as the plate is pivoted, the wedge reduces and limits the available airflow space relative to a non-wedge design with respect to at least a portion of the bore on the inboard side, and opens the bore on the second side 36a of the plate. This effectively reduces the initial air flow by a predetermined amount during the initial acceleration phase. This effectiveness range for reduction in initial airflow is typically a range of motion of from about 1° to about 20° of throttle plate movement along the pivotable axis.

Figure 8:
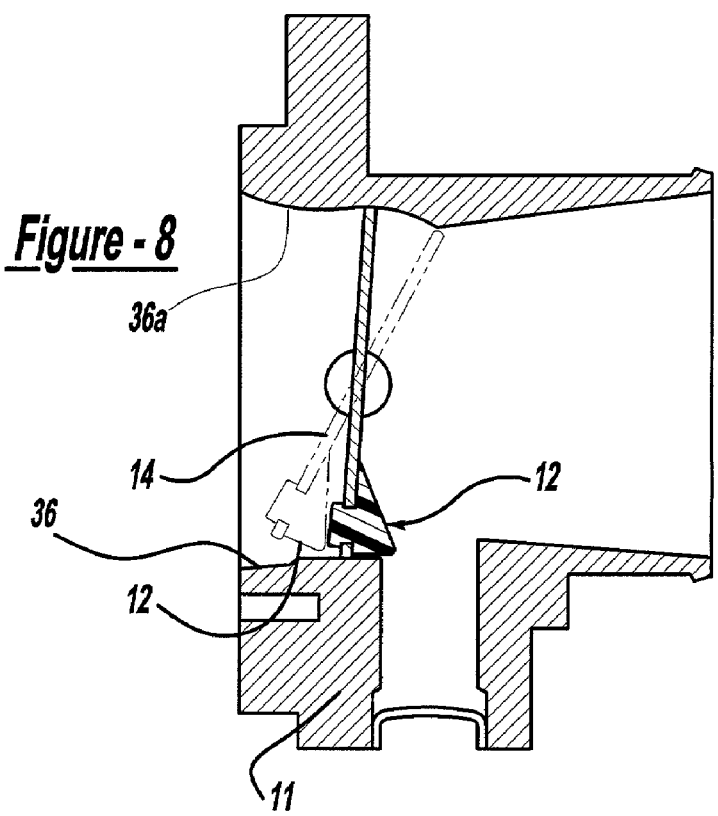
FIG. 8 is a sectional view showing the closed and partially open positions of the throttle plate of the present invention.
Figure 7:
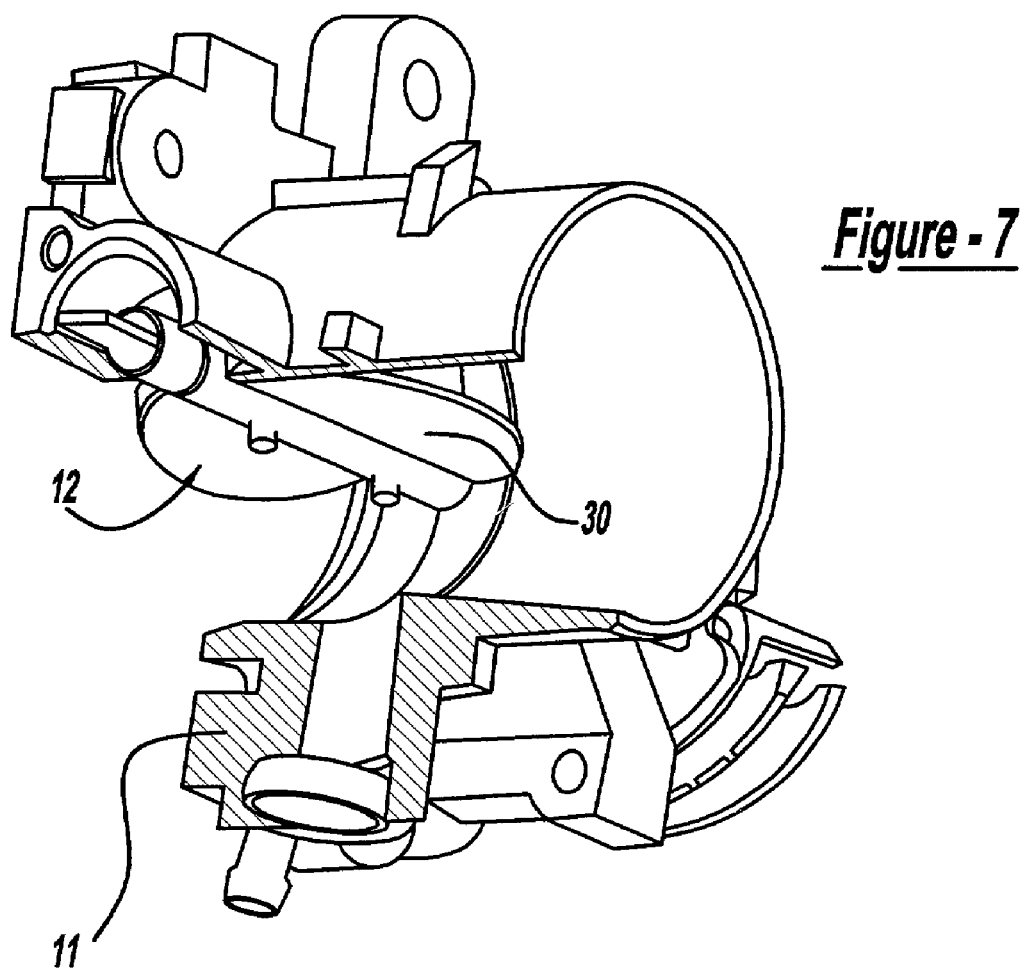
FIG. 7 is a detailed view of the throttle plate of FIG. 1 in a throttle body environment in a fully open position wherein the wedge portion reduces noise from air flow.

Thus, as shown in FIG. 8 in phantom, the face 34 of the wedge surface forms a semicircular portion in the angle shown in phantom, which substantially fills one side of the throttle bore 36 for reducing the passage of air during initial intake.

In order to facilitate clearance of the wedge with the throttle bore, the outermost wall is angled at an angle (a) to the throttle plate. The angle "a" of the outermost wall 32 preferably is from about 70° to about 90° to provide proper air flow characteristics in the present invention. Of course, the design of angle "a", height "b" and dimension "c" are adjusted for particular air flow needs as required. Preferably, the angle is from about 80° to about 90°.

Preferably, the wedge is over-molded with a lightweight glass filled nylon material such as an Ultramid™ nylon material obtained from BASF in Wyandotte, Mich. However, other plastic materials which can be readily over-molded to the throttle plate may be used.

Those skilled in the art can now appreciate from the foregoing description that the broad teachings of the present invention can be implemented in a variety of forms. Therefore, while this invention has been described in connection with particular examples thereof, the true scope of the invention should not be so limited, since other modifications will become apparent to the skilled practitioner upon a study of the drawings, specification and following claims.

What is claimed is:

1. A throttle valve for an air control system, comprising:
a throttle plate pivotally attached in the throttle bore of a throttle body, said throttle plate having a first major face and a spaced and opposed second major face;
said throttle plate being pivotable along an axis for metering the air flow in a throttle bore, said throttle plate attached to a throttle shaft; and
a wedge portion affixed to an outboard edge of said first major face of said throttle plate, wherein at least a portion of a material forming said wedge portion extends through said throttle plate and contacts said second major face of said throttle plate, said wedge portion having a thickness and profile for restricting a portion of the throttle bore and acting to limit air flow as said throttle plate is pivoted for opening of the throttle bore during acceleration of the vehicle, wherein said wedge portion does not contact any portion of said throttle shaft.

2. The throttle valve of claim 1 wherein the wedge portion is overmolded onto the throttle plate.

3. The throttle valve of claim 2 wherein the wedge portion has a sloped outer edge.

4. The throttle valve of claim 2 wherein the wedge portion has a triangular cross-section appearance.

5. The throttle valve of claim 2 wherein the throttle plate has a radially outer most edge and said wedge portion is thickest at said outermost edge and tapers toward said throttle plate in a direction toward the center of the pivotal axis of the plate.

6. The throttle valve of claim 5 wherein an outer peripheral wall extends from said outermost edge, said outer peripheral wall having an angle of from about 7° to about 90°.

7. The throttle valve of claim 1 wherein the airflow is substantially cut off on one hemispherical side of said throttle bore, over a range of angular motion of from 1° to about 20°.

8. The throttle valve of claim 1 wherein the airflow is substantially limited on one hemispherical side of the throttle bore, over a range of angular motion of from 1° to about 15°.

9. A throttle valve for an air control system, comprising:
a throttle plate pivotally attached in a throttle bore of a throttle body, said throttle plate having a first major face and a spaced and opposed second major face;
said throttle plate being pivotable along an axis for metering the air flow in a throttle bore, said throttle plate attached to a throttle shaft; and
a wedge portion overmolded to and affixed to an outboard edge of said first major face of said throttle plate, wherein at least a portion of a material forming said wedge portion extends through said throttle plate and contacts said second major face of said throttle plate, said wedge portion having a thickness and profile for restricting a portion of the throttle bore and acting to limit air flow as said throttle plate is pivoted for opening of the throttle bore during acceleration of the vehicle, wherein said wedge portion does not contact any portion of said throttle shaft;
said throttle wedge including an outermost wall portion, said outermost wall portion having an angle of from about 70° to about 90° with respect to said throttle plate.

10. The throttle valve of claim 9 wherein the wedge portion is overmolded onto the throttle plate.

11. The throttle valve of claim 10 wherein the wedge portion has a sloped outer edge.

12. The throttle valve of claim 10 wherein the wedge portion has a triangular cross-section.

13. The throttle valve of claim 10 wherein the throttle plate has a radially outer most edge and said wedge portion is thickest at said outermost edge and tapers toward said throttle plate in a direction toward the center of the pivotal axis of the plate.

14. The throttle valve of claim 13 wherein an outer peripheral wall extends from said outermost edge, said outer peripheral wall having an angle of from about 70° to about 90°.

15. The throttle valve of claim 9 wherein the airflow is substantially limited on one hemispherical side of said throttle bore, over a range of angular motion of from 1° to about 20°.

16. The throttle valve of claim 9 wherein the airflow is substantially limited on one hemispherical side of said throttle bore, over a range of angular motion of from 1° to about 15°.

17. The throttle valve of claim 16 wherein said wedge includes a slanted wall extending from said outer peripheral wall toward said axis, wherein said surface is positioned substantially perpendicular to a wall of said throttle bore.

18. A throttle valve for an air control system, comprising:
a throttle plate pivotally attached in a throttle bore of a throttle body, said throttle plate having a first major face and a spaced and opposed second major face;
said throttle plate being pivotable along an axis for metering the air flow in a throttle bore, said throttle plate attached to a throttle shaft; and
a wedge portion overmolded onto an outboard edge of said first major face of said throttle plate, wherein at least a portion of a material forming said wedge portion extends through said throttle plate and contacts said second major face of said throttle plate, said wedge portion having a thickness and profile for restricting a portion of the throttle bore and acting to limit air flow as said throttle plate is pivoted for opening of the throttle body during acceleration of the vehicle, wherein said wedge portion does not contact any portion of said throttle shaft;
said wedge portion including an outermost wall portion, said outermost wall portion having an angle of from about 80° to about 90° with respect to said throttle plate for providing clearance of said wedge portion of a side wall of said throttle bore during pivoting of said throttle plate;

said wedge portion having a slanted wall portion extending from said outer peripheral wall toward said axis, wherein said surface is positioned substantially perpendicular to a wall of said throttle bore when said valve plate is tilted at an angle of from about 1° to about 15°.

* * * * *

UNITED STATES PATENT AND TRADEMARK OFFICE
CERTIFICATE OF CORRECTION

PATENT NO. : 6,971,632 B2
DATED : December 6, 2005
INVENTOR(S) : Ed Elliott et al.

It is certified that error appears in the above-identified patent and that said Letters Patent is hereby corrected as shown below:

Column 3,
Line 54, delete "about 7°" and insert -- about 70° --.

Signed and Sealed this

Seventh Day of March, 2006

JON W. DUDAS
*Director of the United States Patent and Trademark Office*